(12) United States Patent
Weill

(10) Patent No.: US 8,615,032 B2
(45) Date of Patent: *Dec. 24, 2013

(54) PROCESS FOR SUB-MICROSECOND TIME TRANSFER USING WEAK GPS/GNSS SIGNALS

(71) Applicant: Magellan Systems Japan, Inc., Hyogo (JP)

(72) Inventor: Lawrence R. Weill, Seal Beach, CA (US)

(73) Assignee: Magellan Systems Japan, Inc., Amagasaki, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,412

(22) Filed: Jan. 22, 2013

(65) Prior Publication Data

US 2013/0136155 A1   May 30, 2013

Related U.S. Application Data

(63) Continuation of application No. 12/747,505, filed as application No. PCT/US2008/086613 on Dec. 12, 2008, now Pat. No. 8,391,341.

(60) Provisional application No. 61/007,711, filed on Dec. 14, 2007.

(51) Int. Cl.
*H04B 1/00* (2006.01)

(52) U.S. Cl.
USPC ........... 375/150; 375/142; 375/145; 375/149; 375/316; 375/340; 375/342; 375/343; 375/354; 370/503; 370/508; 370/509; 370/510; 370/511; 370/512; 370/513; 370/514; 342/357.63; 342/357.68; 342/357.78

(58) Field of Classification Search
USPC ......... 375/142, 145, 149, 150, 316, 340, 342, 375/343, 354; 370/503, 508–514; 342/357.63, 357.68, 357.69, 357.78
See application file for complete search history.

(56) References Cited

U.S. PATENT DOCUMENTS

| | | | |
|---|---|---|---|
| 5,363,110 | A | 11/1994 | Inamiya |
| 6,329,946 | B1 | 12/2001 | Hirata et al. |

(Continued)

FOREIGN PATENT DOCUMENTS

| | | |
|---|---|---|
| EP | 1 538 454 | 6/2005 |
| JP | 6-186317 | 7/1994 |

(Continued)

OTHER PUBLICATIONS

International Search Report dated Jul. 27, 2009 from International Application No. PCT/US2008/086613.

(Continued)

*Primary Examiner* — Daniel Washburn
*Assistant Examiner* — Eboni Hughes
(74) *Attorney, Agent, or Firm* — Beyer Law Group LLP

(57) ABSTRACT

Sub-microsecond time transfer in a GPS/GNSS receiver using a weak GPS/GNSS signal is provided. The digitized complex baseband signal and the generated PN code are cross-correlated for each code period so as to output a complex correlation value at each code epoch of the generated PN code, where a sequence of the output correlation values form a data stream representing the navigation message. Bit synchronization generates bit sync pulses at bit boundaries. The location of a target segment having a known sequence at a known bit location in the navigation message is detected by searching through a plurality of subframes and accumulating search results for the plurality of subframes. Transmission time of the target segment is determined from the detected location of the target segment, with a certain time ambiguity. Accurate local time is determined by solving the time ambiguity using approximate time obtained from an external source.

18 Claims, 9 Drawing Sheets

(56) References Cited

U.S. PATENT DOCUMENTS

| | | | |
|---|---|---|---|
| 6,674,402 B2 * | 1/2004 | Hirata et al. | 342/357.62 |
| 6,725,157 B1 | 4/2004 | Yu | |
| 6,931,055 B1 * | 8/2005 | Underbrink et al. | 375/150 |
| 6,952,440 B1 * | 10/2005 | Underbrink | 375/150 |
| 7,042,930 B2 * | 5/2006 | Dafesh | 375/149 |
| 7,362,265 B2 | 4/2008 | Weill | |
| 7,391,366 B2 * | 6/2008 | Park et al. | 342/357.59 |
| 7,408,504 B2 | 8/2008 | Kishimoto et al. | |
| 2005/0116860 A1 | 6/2005 | Kishimoto et al. | |
| 2006/0031696 A1 | 2/2006 | King et al. | |
| 2007/0008217 A1 | 1/2007 | Yang et al. | |
| 2007/0183486 A1 | 8/2007 | Cheng et al. | |
| 2007/0248152 A1 | 10/2007 | Wang et al. | |
| 2008/0088505 A1 | 4/2008 | Brant et al. | |
| 2008/0180318 A1 | 7/2008 | Glennon et al. | |
| 2009/0040103 A1 * | 2/2009 | Chansarkar et al. | 342/357.12 |
| 2009/0289841 A1 | 11/2009 | Nakamoto et al. | |
| 2011/0007783 A1 * | 1/2011 | Weill | 375/150 |

FOREIGN PATENT DOCUMENTS

| | | |
|---|---|---|
| JP | 7-140224 | 6/1995 |
| JP | 2001-349935 | 12/2001 |
| JP | 2004-340855 | 12/2004 |
| JP | 2005-55375 | 3/2005 |
| JP | 2005-69764 | 3/2005 |
| JP | 2005-148005 | 6/2005 |
| JP | 2005-321298 | 11/2005 |
| JP | 2006-58199 | 3/2006 |
| JP | 2006-189320 | 7/2006 |
| JP | 2006-220532 | 8/2006 |
| JP | 2006-284452 | 10/2006 |
| JP | 2006-337260 | 12/2006 |
| KR | 2002-0063026 | 8/2002 |
| KR | 1020060005573 | 1/2006 |
| WO | 00/14560 | 3/2000 |
| WO | 01/75470 | 10/2001 |
| WO | 2004/034077 | 4/2004 |

OTHER PUBLICATIONS

Written Opinion dated Jul. 27, 2009 from International Application No. PCT/US2008/086613.

Search Report dated Sep. 1, 2009 from International Application No. PCT/US2009/035627.

Written Opinion dated Sep. 1, 2009 from International Application No. PCT/US2009/035627.

Supplementary Search Report dated Mar. 16, 2011 from European Application No. 08861219.7.

Supplementary Search Report dated Aug. 5, 2011 from European Application No. 09716140.0.

Bullock et al., "Test results and analysis of a low cost core GPS receiver for time transfer applications", Frequency Control Symposium, Proceedings of the 1997 IEEE International. Orlando FL, USA May 28-30, 1997, New York, NY USA, IEEE, May 28, 1997, p. 314-322.

Syrjarinne, "Possibilities for GPS Time Recovery with GSM Network Assistance", Proceedings of the Institute of Navigation (ION) GPS, Sep. 19, 2000, p. 955-965.

Djemouai et al., "Short locking time FLL and PLL based on a DLL technique", Proc. $43^{rd}$ IEEE Midwest Symp. on Circuits and Systems, vol. 2, Aug. 8, 2000, p. 952-955.

* cited by examiner

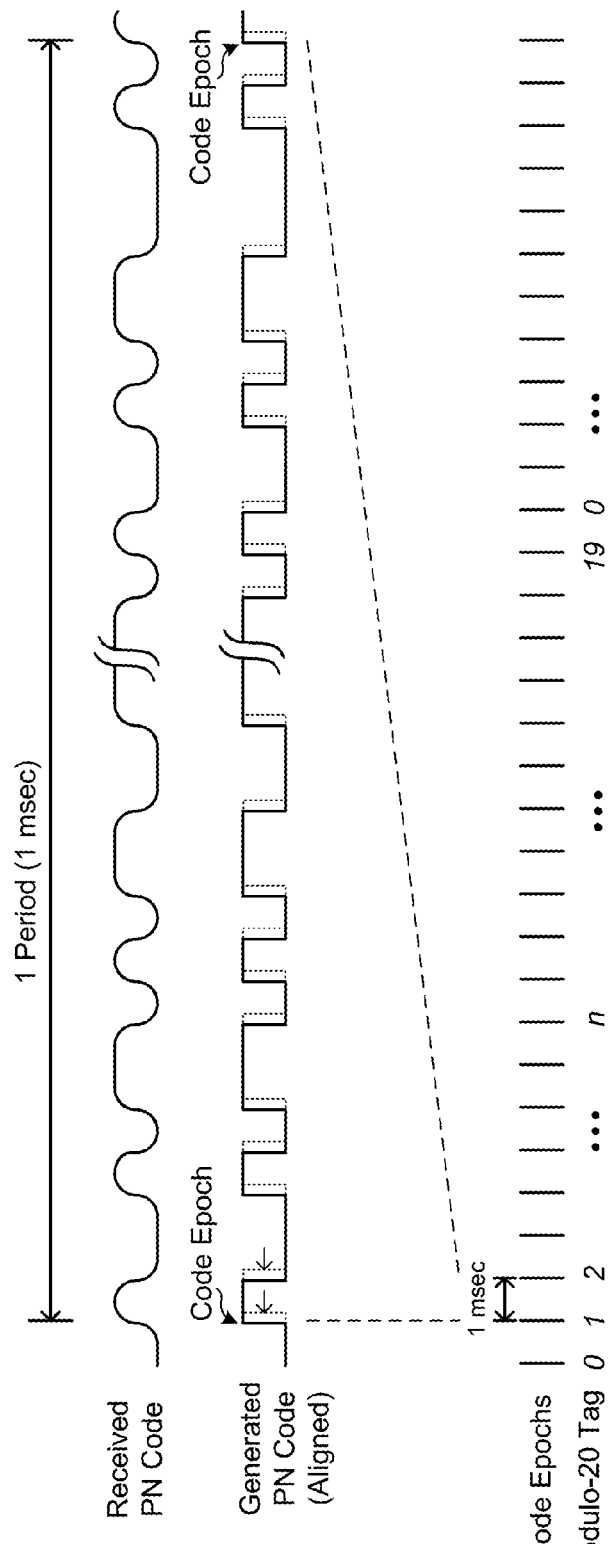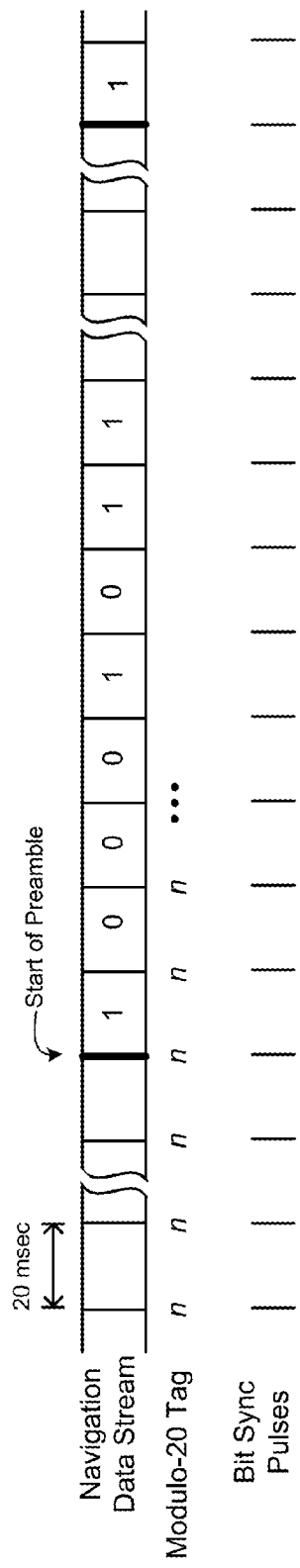
FIG. 2A
FIG. 2B

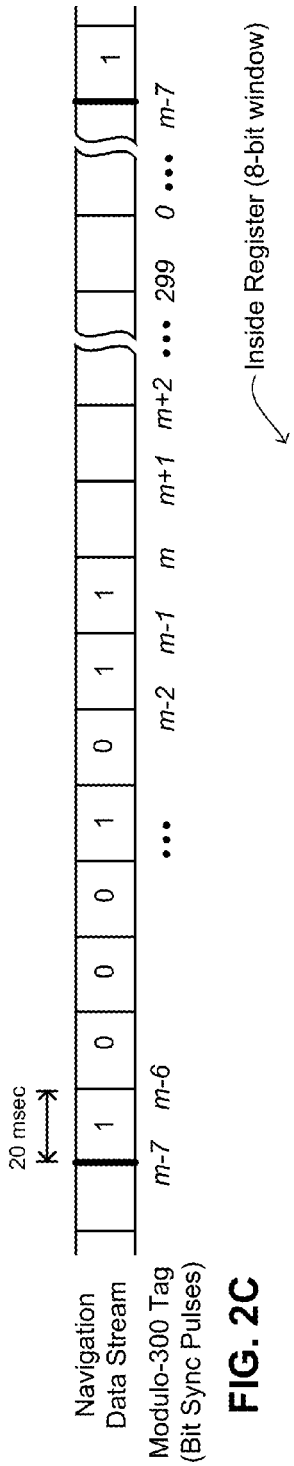
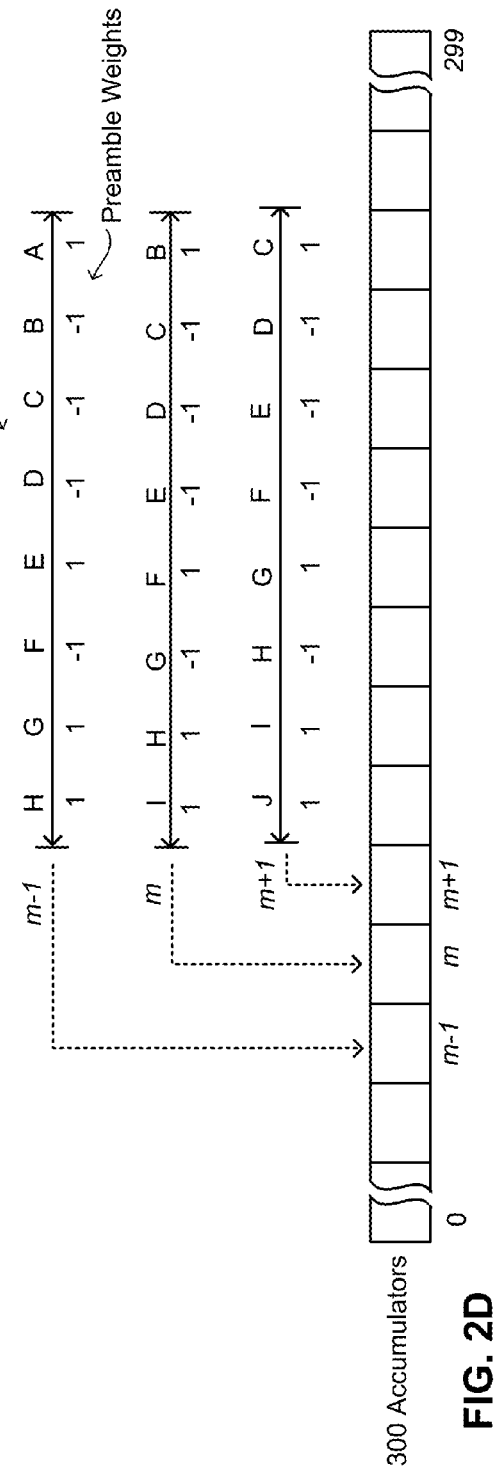
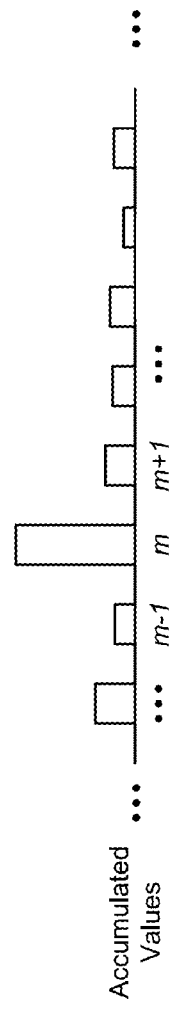
FIG. 2C
FIG. 2D
FIG. 2E

PROCESS FOR SUB-MICROSECOND TIME TRANSFER USING WEAK GPS/GNSS SIGNALS

CROSS REFERENCE TO RELATED APPLICATION

This Application is a Continuation of application Ser. No. 12/747,505 filed Jun. 10, 2010, which is a National Phase of PCT/US2008/086613 filed Dec. 12, 2008, which claims benefit of U.S. Provisional Application No. 61/007,711 filed Dec. 14, 2007, which are all incorporated herein by reference.

BACKGROUND OF THE INVENTION

The present invention relates to GPS/GNSS receivers. More specifically, the present invention relates to time transfer in GPS/GNSS receivers using weak GPS/GNSS signals.

The use of GPS/GNSS signals for time transfer at the sub-microsecond level is a well-established art. However, most conventional methods depend on the ability of a GPS/GNSS receiver to accurately demodulate timing information from the received GPS/GNSS signal. This implies that the signal must be strong enough to keep the demodulated bit error rate acceptably small (for example, less than about $10^{-5}$), which can be guaranteed only if the received signal power is above approximately −148 dBm. Accordingly, it is difficult to establish sub-microsecond time transfer using very weak GPS/GNSS signals suffering severe attenuation, such as those received indoors or in urban canyons.

BRIEF DESCRIPTION OF THE INVENTION

The embodiments of the present invention provide a method of sub-microsecond time transfer in a GPS/GNSS receiver using a weak GPS/GNSS signal from a satellite. A digitized complex baseband signal of the GPS/GNSS signal carries a PN code (referred to as "received PN code") and a navigation message. The GPS/GNSS receiver generates a PN code for the satellite (referred to as "generated PN code"). The generated PN code is time-aligned with the received PN code. A timing signal indicating code epochs of the generated PN code is generated, where each code epoch marks a beginning of each period of the generated PN code (referred to as a "code period"). The baseband signal is received, and the baseband signal and the generated PN code are cross-correlated for each code period in accordance with the timing signal, so as to output a complex correlation value at each code epoch, where a sequence of the complex correlation values forms a data stream representing the navigation message. Bit boundaries of the data stream are located, and numbered bit sync pulses are generated at the bit boundaries. The bit location of a target segment is detected in the navigation message, where the target segment has a known sequence of k bits at a known bit location in each subframe of the navigation message. The location of the target segment is detected by searching through a plurality of subframes and accumulating search results for the plurality of subframes. Transmission time of the target segment is determined, with a certain time ambiguity, based on the detected bit location.

Accurate (sub-microsecond) local time at the GPS/GNSS receiver may be determined by solving the certain time ambiguity in the transmission time, using approximate time obtained from an external source, and by correcting a propagation delay.

The digitized complex baseband signal may be Doppler-compensated before the cross-correlation, using a frequency-locked loop (FLL). The generated PN code may be aligned with the received PN code by correlating the received PN code and the generated PN code, using a delay-locked loop (DLL).

In one aspect of the invention, the detection of the target segment includes (a) accumulating the complex correlation values for one bit period to obtain a corresponding complex bit value, (b) placing the complex bit value in a k-stage complex shift register at a corresponding bit sync pulse, the shift register holding a sequence of most recent k complex bit values, (c) obtaining a weighted sum of the sequence of the most recent k complex bit values, each complex bit value being weighted by a respective one of a sequence of weights, the sequence of the weights corresponding to the known bit sequence of the target segment, and obtaining the magnitude of the weighted sum, (d) storing the magnitude of the weighted sum in an accumulator which is associated with the corresponding bit sync pulse at which the latest complex bit value is placed into the shift register, (e) iterating steps (a) through (d) until the magnitudes of the weighted sums are placed in a predetermined number of accumulators, (f) repeating step (e) for a plurality of times such that each of the predetermined number of accumulators accumulates the weighted sums, (g) determining one of the accumulators which contains a largest accumulated value of the magnitudes and a specific bit sync pulse associated therewith, and (h) identifying a bit location of the target segment within a subframe based on the specific bit sync pulse. The bit location may be the location of the first bit of the target segment.

The step (c) of obtaining the magnitude of the weighted sum may include (c1) performing k-point fast Fourier transform (FTT) on the weighted complex bit values to generate k FTT outputs, (c2) calculating magnitude of each of the k FTT outputs, and (c3) obtaining a maximum value of the magnitude as the magnitude of the weighted sum.

The target segment may be the preamble of the subframe in the navigation message, where number k is 8. Alternatively, the target segment may be the Time of Week (TOW) in the navigation message, where number k is 17.

The certain time ambiguity may be a 6 (±3) second ambiguity. The predetermined number of accumulators may be a bank of accumulators including 300 accumulators.

Other embodiments of the invention also provide a method of sub-microsecond time transfer in a GPS/GNSS receiver using a weak GPS/GNSS signal from a satellite, in which the target segment is detected by searching for the target segment through the navigation message and comparing a search result with a predetermined threshold value. Transmission time of the target segment is determined, with a certain time ambiguity, based on the bit location.

The detection of the target segment may include (a) accumulating the complex correlation values for one bit period to obtain a corresponding complex bit value, (b) placing the bit value in a k-stage complex shift register at a corresponding bit sync pulse, the shift register holding a sequence of most recent k complex bit values, (c) obtaining a weighted sum of the sequence of the most recent k complex bit values, each complex bit value being weighted by a respective one of a sequence of weights, the sequence of the weights corresponding to the known bit sequence of the target segment, and obtaining the magnitude of the weighted sum, (d) determining if the magnitude of the weighted sum exceeds a predetermined threshold value, (e) repeating steps (a) through (d) if the magnitude of the weighted sum does not exceed the predetermined threshold value, and (f) identifying the corresponding bit sync pulse at which the latest bit value is placed into the shift register as a bit location of the target segment, if the magnitude of the weighted sum exceeds the predetermined threshold value.

The step (c) of obtaining the magnitude of the weighted sum may include (c1) performing k-point fast Fourier transform (FTT) on the weighted complex bit values to generate k FTT outputs, (c2) calculating a magnitude of each of the k FTT outputs, and (c3) obtaining a maximum value of the magnitudes of the k FTT outputs as the magnitude of the weighted sum. A frequency error signal may be generated based on the frequency associated with the k-point FTT output having the maximum magnitude.

If the target segment occurs once in every frame, the certain time ambiguity is a 30 (±15) second ambiguity. If the target segment occurs once in every navigation message, the certain time ambiguity is a 12.5 (±6.25) minute ambiguity.

The target segment may be an ephemeris data segment in the navigation message, and number k may be 128 or more.

Embodiments of the present invention also provide specific bit synchronization by locating bit boundaries using a weak GPS/GNSS signal. There are 20 code epochs per data bit. Locating the bit boundaries includes (a) placing the complex correlation value in a 20-stage complex shift register at a corresponding code epoch in accordance with the timing signal, the shift register holding a sequence of most recent 20 complex correlation values, (b) summing the 20 complex correlation values in the shift register at each epoch, (c) calculating a magnitude value of the sum of the 20 complex correlation values, (d) storing the magnitude value in one of 20 accumulators which is associated with the code epoch at which the latest complex correlation value is placed into the shift register, (e) iterating steps (a) through (d) until a respective magnitude value is placed in each of the 20 accumulators, (f) repeating step (e) for a plurality of times such that each of the 20 accumulators accumulates the magnitude values, (g) determining one of the 20 accumulators containing a largest accumulated value of the magnitude values and a specific code epoch associated with the accumulator containing the largest accumulated value, (h) identifying the specific code epoch as a bit boundary of the data stream, and (i) outputting the bit sync pulse occurring every 20 code epochs.

The weak GPS/GNSS signal has a signal level less than about −151 dBm, more generally, less than −148 dBm. The weak GPS/GNSS signal may have a signal level less than −160 to −170 dBm.

Other embodiments of the present invention also provide a GPS/GNSS receiver having a sub-microsecond time transfer circuit using a weak GPS/GNSS signal from a satellite. The GPS/GNSS signal carries a PN code (referred to as "received PN code") and a navigation message. The GPS/GNSS receiver includes a PN code generator for generating a PN code for the satellite (referred to as "generated PN code"). The PN code generator also outputs a timing signal indicating code epochs of the generated PN code, each code epoch marking a beginning of each period of the generated PN code (referred to as "code period"), a cross-correlator for cross-correlating the generated PN code and a digitized complex baseband GPS/GNSS signal for each code period in accordance with the timing signal so as to output a complex correlation value at each code epoch, a sequence of the complex correlation values forming a data stream representing the navigation message, and a bit synchronizer for locating bit boundaries of the data stream and generating numbered bit sync pulses at the bit boundaries.

In one aspect of the invention, the GPS/GNSS receiver further includes a target segment locator coupled to the bit synchronizer and the cross-correlator, for detecting a target segment in the navigation message, the target segment having a known sequence of k bits at a known bit location in each subframe of the navigation message. The target segment locator searches through a plurality of subframes and accumulates search results for the plurality of subframes so as to identify a specific bit sync pulse as a bit location of the target segment within a subframe. The GPS/GNSS receiver also includes a transmission time determiner for determining transmission time of the target segment with a certain time ambiguity, based on the bit location of the target segment and known transmission time of a particular bit in the navigation message.

The GPS/GNSS receiver may further include a local time determiner. The local time determiner includes a time ambiguity resolution section for solving the certain time ambiguity using approximate time obtained from an external source so as to determine local time with sub-microsecond accuracy, and a propagation delay correction section.

In one aspect of the invention, the target segment locator include a one-bit accumulator for accumulating the complex correlation values for one bit period to obtain a complex bit value, a k-stage complex shift register for placing the complex bit value in accordance with a corresponding bit sync pulse, the shift register holding a sequence of most recent k complex bit values, a weighted multiplexer for obtaining a weighted sum of the sequence of the most recent k complex bit values, each complex bit value being weighted by a respective one of a sequence of weights, the sequence of the weights corresponding to the known bit sequence of the target segment, a bank of accumulators for storing the magnitudes of the weighted sums in accordance with the corresponding bit sync pulses, and a controller for determining a specific accumulator of the bank which contains a largest value of the accumulated magnitudes of the weighted sums and identifying the bit location of the target segment based on a specific bit sync pulse associated with the specific accumulator.

The weighted multiplexer may include a k-point fast Fourier transformer (FTT) for performing k-point FTT on the weighted complex bit values to generate k FTT outputs, and a magnitude calculator for calculating magnitude of each of the k FTT outputs and obtaining a maximum value of the magnitudes of the k FTT outputs as the magnitude of the weighted sum.

The target segment may be the preamble of the subframe in the navigation message, and number k is 8. The target segment may be the Time of Week (TOW) in the navigation message, and number k is 17.

The certain time ambiguity may be a 6 (±3) second ambiguity. The bank of accumulators may have 300 accumulators.

Other embodiments of the invention provide another target segment locator of the GPS/GNSS receiver which is coupled to the bit synchronizer and the cross-correlator. The target segment locator locates a target segment in the navigation message, where the target segment has a known sequence of k bits at a known bit location in the navigation message. The target segment locator searches for the target segment through the navigation message so as to detect a bit location of a target segment by comparing a search result with a predetermined threshold value.

The target segment locator may include a one-bit accumulator for accumulating the complex correlation values for one bit period to obtain a complex bit value, a k-stage complex shift register for placing the complex bit value in accordance with a corresponding bit sync pulse, the shift register holding a sequence of most recent k complex bit values, a weighted multiplexer for obtaining a weighted sum of the sequence of the most recent k complex bit values, each complex bit value being weighted by a respective one of a sequence of weights, the sequence of the weights corresponding to the known bit sequence of the target segment, a comparator for determining if the magnitude of the weighted sum exceeds a predetermined threshold value, and a controller for identifying, if the magnitude of the weighted sum exceeds a predetermined threshold value, the bit location of the target segment from the bit sync pulse at which the latest bit value is placed into the shift register.

The weighted multiplexer may include a k-point fast Fourier transformer (FTT) for performing k-point FTT on the weighted complex bit values to generate k FTT outputs, and a magnitude calculator for calculating magnitude of each of the k FTT outputs and obtaining a maximum value of the magnitudes of the k FTT outputs as the magnitude of the weighted sum.

The weighted multiplexer may further include a frequency error signal generator for generating a frequency error signal based on a frequency associated with the k-point FTT output having the maximum magnitude.

The target segment may occur once in every frame and the certain time ambiguity is a 30 (±15) second ambiguity. The target segment may be an ephemeris data segment in the navigation message, and number k may be 128 or more. Alternatively, the target segment may occur once in every navigation message and the certain time ambiguity is a 12.5 (±6.25) minute ambiguity.

In one aspect of the invention, the GPS/GNSS receiver may further include a frequency-locked loop (FLL) for compensating Doppler errors in the baseband signal. The GPS/GNSS receiver may also include a delay-locked loop (DLL) for aligning the generated PN code with the received PN code by correlating the received PN code and the generated PN code.

Embodiments of the present invention also provide a specific bit synchronizer for the GPS/GNSS receiver using a weak GPS/GNSS signal. There are 20 code epochs per data bit. The bit synchronizer includes a 20-stage complex shift register for placing the complex correlation value at a corresponding code epoch in accordance with the timing signal, the shift register holding a sequence of most recent 20 complex correlation values, an adder for summing the 20 complex correlation values in the shift register at each epoch, a magnitude calculator for calculating a magnitude of the sum of the 20 complex correlation values, a bank of accumulators for storing a magnitude value in accordance with the code epochs for a certain period of time, a controller determining one of the accumulators which contains a largest accumulated value of the magnitude values and identifying a specific code epoch associated with the accumulator containing the largest accumulated value as a bit boundary of the data stream, and a bit sync pulse generator for outputting bit sync pulse at code epochs corresponding to the bit boundaries.

Other embodiments of the present invention provide a method for establishing a position of a GPS/GNSS receiver. The method includes (a) observing first and second GPS/GNSS signals from a first pair of satellites including first and second satellites, the first GPS/GNSS signal defining a first point on a first signal structure, and the second GPS/GNSS signal defining a second point on a second signal structure, (b) obtaining a first transmission time ($T_{A1}$) of the first point in the first GPS/GNSS signal and a second transmission time ($T_{B1}$) of the second point in the second GPS/GNSS signal, (c) locating a first position of the first satellite based on the first transmission time, and a second position of the second satellite based on the second transmission time, (d) computing a difference in the first and second transmission times ($\Delta_1 = T_{A1} - T_{B1}$), the difference $\Delta_1$ defining a line of position $P_{C1}$ ($\Delta_1$) on a surface of the earth along which the time difference is to be observed, using given knowledge of altitude as a function of latitude and longitude, (e) after a certain time period, repeating steps (a) through (d) for a second pair of satellites at different positions, so as to obtain a second line of position $P_{C2}$ ($\Delta_2$) on the surface of the earth, wherein $\Delta_2 = T_{A2} - T_{B2}$, $T_{A2}$ and $T_{B2}$ are two transmission times of the second pair of satellites at the different positions, and (f) obtaining the receiver position at an intersection of the two lines of position $P_{C1}$ ($\Delta_1$) and $P_{C2}$ ($\Delta_2$). The second pair of satellites may include one or both of the satellites in the first pair of satellites.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a schematic timing diagram illustrating the received PN code, the generated PN code, and the corresponding code epochs in accordance with one embodiment of the present invention.

FIG. 2B is a schematic diagram illustrating the navigation data stream and the corresponding bit sync pulses in accordance with one embodiment of the present invention.

FIG. 2C is a diagram schematically illustrating the navigation data stream and the modulo-300 tags.

FIG. 2D is a diagram schematically illustrating the 8-stage shift register and 300 accumulator operations in accordance with one embodiment of the present invention.

FIG. 2E is a schematic diagram illustrating the accumulated values in the 300 accumulators.

DETAILED DESCRIPTION OF EMBODIMENTS OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention provides a new method and apparatus which permit sub-microsecond time transfer using very weak GPS/GNSS signals suffering severe attenuation, such as those received indoors or in urban canyons. Depending on several factors, signals as weak as −160 to −170 dBm can be used. Once time transfer has been initiated, it can be maintained using only one GPS/GNSS satellite at any given moment, and handovers from one satellite to another are made possible. Methods will also be described for maintaining time accuracy when all satellite signals drop below the tracking threshold.

For concreteness, the embodiments of the present invention are described using $L_1$ C/A (Coarse Acquisition)-coded GPS signals. However, it is well understood by those of ordinary skill in the art that the present invention is not limited to the use of specific GPS signal, but can be applied to other GNSS signals as well. Similarly, a GPS receiver in the following description may be a GNSS receiver.

In the description, it is assumed that the following conditions are satisfied: (1) the GPS receiver is stationary; (2) The position of the GPS receiver is established by any of various methods; (3) Data such as satellite ephemeris data, satellite clock correction data, almanac data, and other data, such as Time of Week (TOW), in the navigation message is available from an external source, such as the internet or an assisting DSL (ADSL) link; (4) Once initiated, the time transfer is continuously available, but relatively long time intervals are permitted for its initiation. Intervals on the order of 10 minutes to tens of hours might be acceptable for this purpose. In addition, the GPS receiver and its time transfer hardware/software should be low-cost. Also, low power consumption is not necessary.

Figure 1:
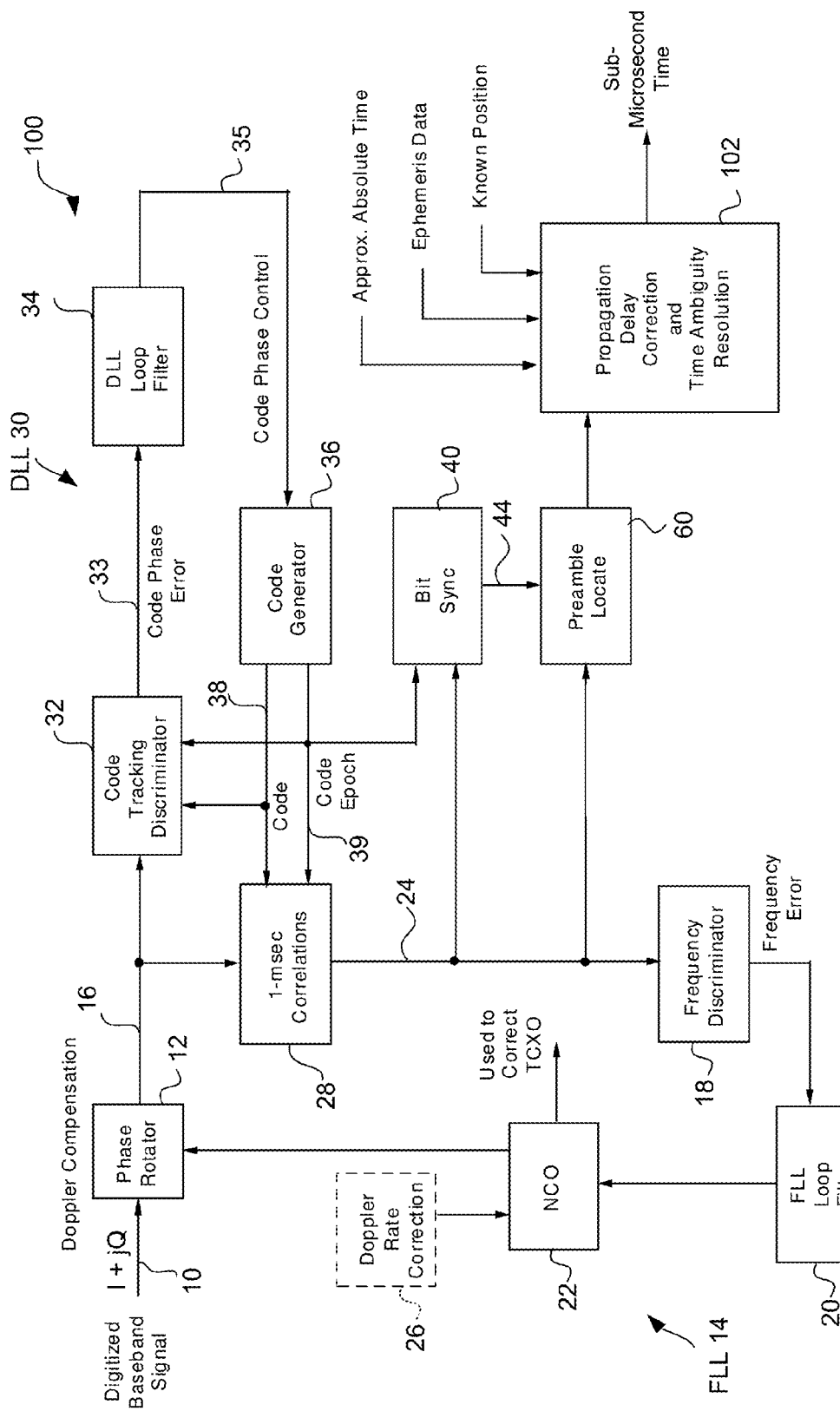
FIG. 1 is a block diagram schematically illustrating a method and corresponding circuitry for sub-microsecond time transfer in accordance with one embodiment of the present invention.

FIG. 1 is a block diagram schematically illustrating a method and corresponding circuitry 100 for sub-microsecond time transfer from a single satellite in accordance with one embodiment of the present invention. If more satellite signals are available, all elements in the figure are replicated for each satellite tracked. FIG. 1 only shows part of a GPS receiver which is able to obtain very accurate time, i.e., sub-microsecond time from a very weak GPS signal. It is assumed that the position of the receiver is known within approximately 100 meters for sub-microsecond accuracy, and that a satellite signal has already been acquired and code and carrier frequency tracking have been initiated. That is, as shown in FIG. 1, the input signal to the circuitry 100 is a digitized baseband signal 10 which is received by a radio frequency (RF) front end portion (not shown) of the GPS receiver and has been converted into the baseband frequency.

The signal acquisition, code tracking, and carrier frequency tracking may be performed using any conventional processes well known to those of ordinary skill in the art. The signal acquisition, code tracking, and carrier frequency tracking are not part of the present invention and thus they are not described in this specification in detail. Methods of initially establishing the position of the receiver will be discussed later. It should be noted that the digitized baseband signal 10 is a complex signal and may be expressed as I+jQ (I: real or cosine component, Q: imaginary or sine component). The signal processing is thus carried out in two channels, although figures do not explicitly show two channels for simplicity.

Frequency-Locked Loop

In order to track very weak signals, carrier tracking is accomplished by means of a frequency-locked loop (FLL) with very narrow bandwidth (on the order of 0.01 Hz), which is much narrower than conventional FLL for GPS signals. It should be noted that traditional Costas phase-locked loops (PLL's) are not suitable for tracking very weak signals (below about −151 dBm), because they suffer too much SNR loss due to the signal squaring that is necessary to eliminate data-bit-caused noncoherence. It might be thought that the SNR loss could be regained by using an extremely small PLL loop bandwidth (perhaps as small as 0.01 Hz). However, at such small loop bandwidths, the PLL can have difficulty tracking the signal phase instability after frequency conversion to baseband. The phase instability is caused by the phase instability of the typical low-cost receiver TCXO reference oscillator that serves as a frequency reference in the receiver.

Referring to FIG. 1, the complex (I+jQ) digitized baseband GPS signal 10 is Doppler compensated by a phase rotator 12 which is controlled by the FLL 14 to drive the signal frequency nominally to zero frequency at the phase rotator output 16. The FLL 14 includes a frequency discriminator 18, an FLL loop lowpass filter 20, and a numerically-controlled oscillator (NCO) 22. The input signal 24 to the frequency discriminator 18 consists of the complex outputs (I+jQ) of 1-millisecond signal correlations (correlator) 28, which is to be described below in more detail. The frequency discriminator 18 is designed to minimize the effect of polarity transitions in the received 50 bit/sec navigation data so that it will pull in even when the timing of the data bit boundaries is unknown.

Because the receiver is stationary, is at a known location (approximate location), and ephemeris data is available, a known Doppler rate correction 26 is applied to the phase rotator 12 via the NCO 22 as shown in FIG. 1. The Doppler rate correction may be no greater than 1 Hz/sec, and is not sensitive to moderate errors in the known receiver position. This removes essentially all frequency change on the signal due to satellite motion and enhances the operation of the FLL 14 which detects and removes the residual Doppler error by controlling the NCO 22 via the FLL loop filter 20.

Simulations show that the FLL can track a signal as weak as −165 dBm with a maximum frequency tracking error of about ±10 Hz, and a pull-in time constant on the order of several minutes. This high level of performance is made possible by the stationarity of the receiver and the Doppler rate correction of the NCO 22, both of which keep the signal frequency essentially constant. The frequency tracking error is small enough to permit proper operation of the time extraction to be described later.

Code Tracking Delay-Locked Loop (DLL)

FIG. 1 also shows a code tracking delay-lock loop (DLL) 30 which includes a code tracking discriminator 32, a DLL lowpass loop filter 34, and a code generator 36 which produces a locally generated replica 38 of the received C/A-PN (Pseudorandom Noise) code. The code tracking discriminator (correlator) 32 correlates the generated PN code 38 and the received PN code (in the Doppler compensated baseband signal 16) and outputs a code phase error signal 33 if the generated PN code 38 and the received PN code 16 are not aligned. The DLL loop filter 34 removes noise in the code phase error signal 33 and applies the signal as a code phase control signal 35 to the code generator 36. The code generator 36 outputs the generated PN code 38 thus aligned. That is, the DLL 30 controls the code generator 36 to keep the replica PN code 38 time-aligned with the received PN code 16 appearing at the output of the phase rotator 12. The code generator 36 also outputs a code epoch signal (timing signal) 39 at each epoch of the locally generated PN code 38, where an epoch occurs every millisecond.

During a normal operation when sub-microsecond time is available, the sensitivity of the DLL tracking loop 30 can be significantly enhanced because the receiver's known location, the ephemeris data, and accurate knowledge of time permit the Doppler trajectory of the satellite to be predicted very accurately. It is expected that the DLL 30 will be able to track signals as low as −170 dBm using a very narrow loop bandwidth (about 0.01 Hz or less).

Millisecond Correlations

As shown in FIG. 1, the 1-msec correlations (correlator) 28 cross-correlates the signal 16 (received PN code) at the phase rotator output with the PN code 38 coming from the code generator 36 to produce a continuing sequence of complex-valued (I+jQ) 1-millisecond correlation outputs (complex correlation values) 24. The output of each correlation and the beginning of the next correlation occur at each epoch of the locally generated code, where an epoch occurs every millisecond. That is, controlled by the code epoch signal (timing signal) 39, the 1-msec correlator 28 cross-correlates the baseband signal 16 and the generated PN code 38 for each code period (i.e., 1 millisecond or 1023 chips) and outputs the complex correlation value at each code epoch. The sequence of the complex correlation values (I+jQ) forms a data stream representing the navigation message.

Because the DLL 30 keeps the locally generated PN code 38 aligned with the received PN code 16, the output of each correlation is near the peak of the correlation function, thereby giving enough processing gain to enable the ensuing FLL, bit synchronization, and time transfer operations. FIG. 2A schematically illustrates the received PN code, the aligned generated PN code, and the corresponding code epochs.

Bit Synchronization

As is well known to those of ordinary skill in the art, the 50-bps (bit per second) data stream of the GPS signal conveys the navigation message. The 50-bps data bit boundaries always occur at an epoch of the PN code. The PN code epochs mark the beginning of each period (1 millisecond, 1023 chips) of the PN code, and there are precisely 20 code epochs per data bit (20 milliseconds, 20,460 chips). In order to operate at extremely low signal levels where phase cannot be reliably tracked, a long-term partially coherent method of bit synchronization is performed at a bit synchronizer 40. The bit synchronizer 40 locates bit boundaries in the GPS data stream and generates numbered (tagged) bit sync pulses at the bit boundaries in accordance with one embodiment of the present invention.

Figure 3:
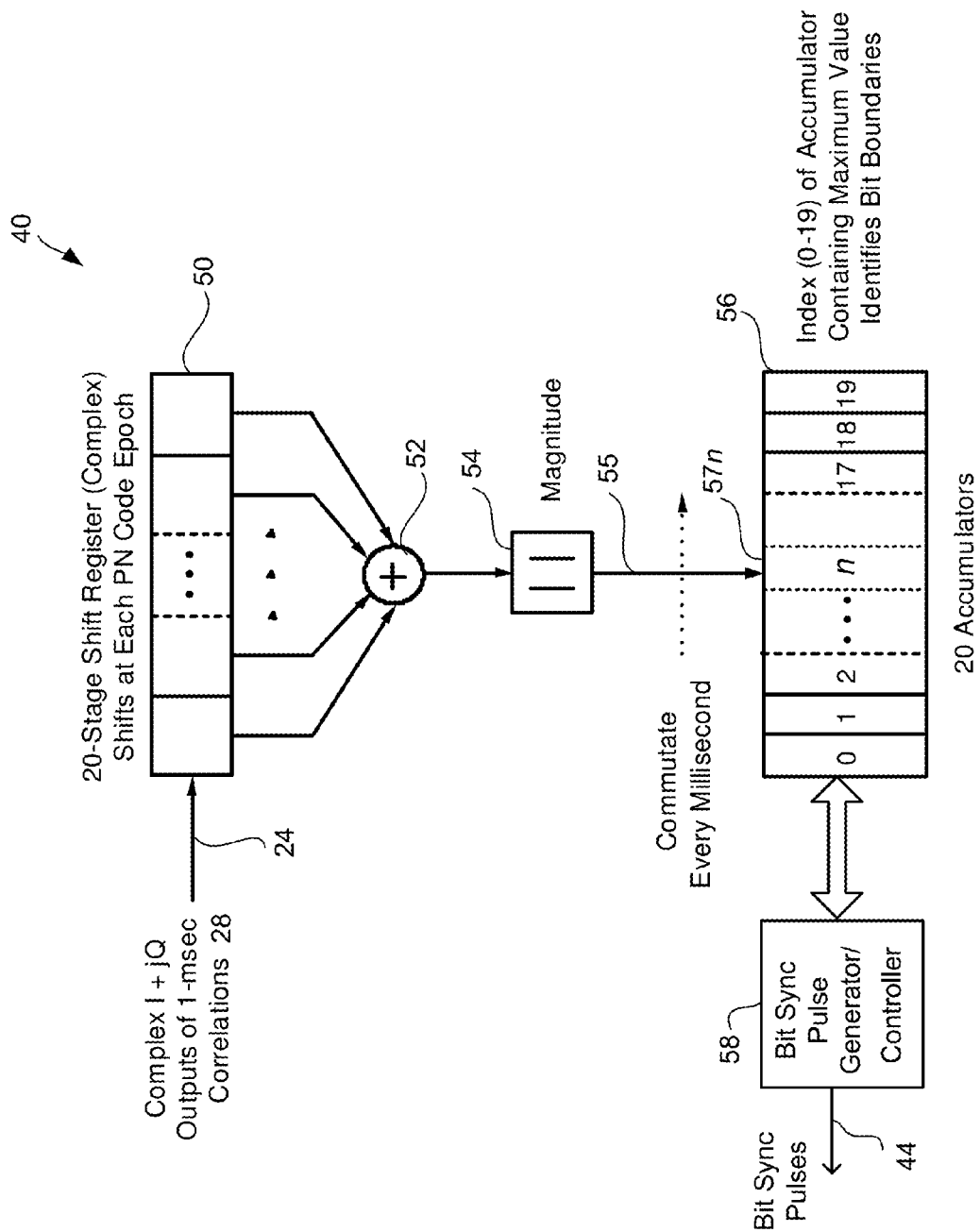
FIG. 3 is a diagram schematically illustrating an example of the bit synchronizer and corresponding bit synchronization process, in accordance with one embodiment of the present invention.

FIG. 3 schematically illustrates an example of the bit synchronizer 40 and corresponding bit synchronization process, in accordance with one embodiment of the present invention. As shown in FIG. 3, the bit synchronizer 40 includes a 20-stage complex shift register 50, an adder 52, and 20 accumulators 56. The complex (I+jQ) correlation values 24 output from the 1-millisecond correlator 28 (shown in FIG. 1) enter the 20-stage shift register 50 at each occurrence of an epoch of the locally generated PN code 38, so that the shift rate is nominally 1000 shifts/second. The epochs provided by the code epoch signal 39 also continuously drive a modulo-20 counter (not shown), which tags each epoch with a modulo-20 number (0-19), as shown in FIG. 2A. Referring back to FIG. 3, for each shift the complex correlation values in the 20 stages of the shift register 50 are summed by the adder 52, and the magnitude of the sum is taken by the magnitude calculator 54. The magnitude value 55 of the sum is placed into one of the 20 accumulators 56, where the specific accumulator $57n$ ($0 \le n \le 19$) has the same index n as the modulo-20 tag of the latest PN code epoch.

The magnitude values 55 summed into the accumulators 56 will tend to be largest when a full bit of the signal data resides in the shift register 50, since the bit values (correlation values) remain the nearly the same (except for noise) within the same bit. This condition, which is repeated every 20 milliseconds, always occurs at the same modulo-20 tag of the PN code epochs. At other epochs, data bit polarity transitions will frequently appear within the shift register 50, tending to reduce the magnitude values 55. Thus, after a sufficiently long time (repeating the accumulating process), the index n of the accumulator containing the largest accumulated value $57n$ will be the modulo-20 tag n of the code epochs where the data bit transitions occur (i.e. the bit boundary). The bit sync pulse generator 58 of the bit synchronizer 40 can now produce a bit sync pulse 44 each time these specific code epochs occur. Data bits end and start at the bit sync pulse 44. FIG. 2B schematically illustrates an example of the navigation data stream and corresponding bit sync pulses. The bit synchronizer 40 may also include a controller (not shown) which determines one of the accumulators 56 containing the largest accumulated value and identifies the specific code epoch associated with that accumulator as the bit boundary of the data stream. The controller may be part of the bit sync pulse generator 58.

Simulations show that this method of bit sync is very reliable at −160 dBm when allowed to run for 1 minute, at −168 dBm when run for 10 minutes, and at −170 dBm when run for 30 minutes, even when the FLL frequency tracking error is as great as ±10 Hz.

Obtaining Signal Transmission Time

The key to obtaining sub-microsecond time is the ability to determine the Space Vehicle (SV) time at which any given point on the received signal was transmitted. The transmission times of certain parts of the signal are known a-priori, but generally with some time ambiguity which can be resolved by various methods to be described. If the occurrence of those parts of the signal can be detected, it is then possible to determine the SV time when any part of the signal was transmitted. Clock correction data from an external source can then convert the SV time to very accurate GPS time. As is well known to those of ordinary skill in the art, time defined by the clocks in the satellite is commonly referred to as SV time, and the time after corrections have been applied is referred to as GPS time. Thus, even though individual satellites may not have perfectly synchronized SV times, they share a common GPS time.

EXAMPLE 1

Detecting Occurrence of the Subframe Preamble

Figure 4:
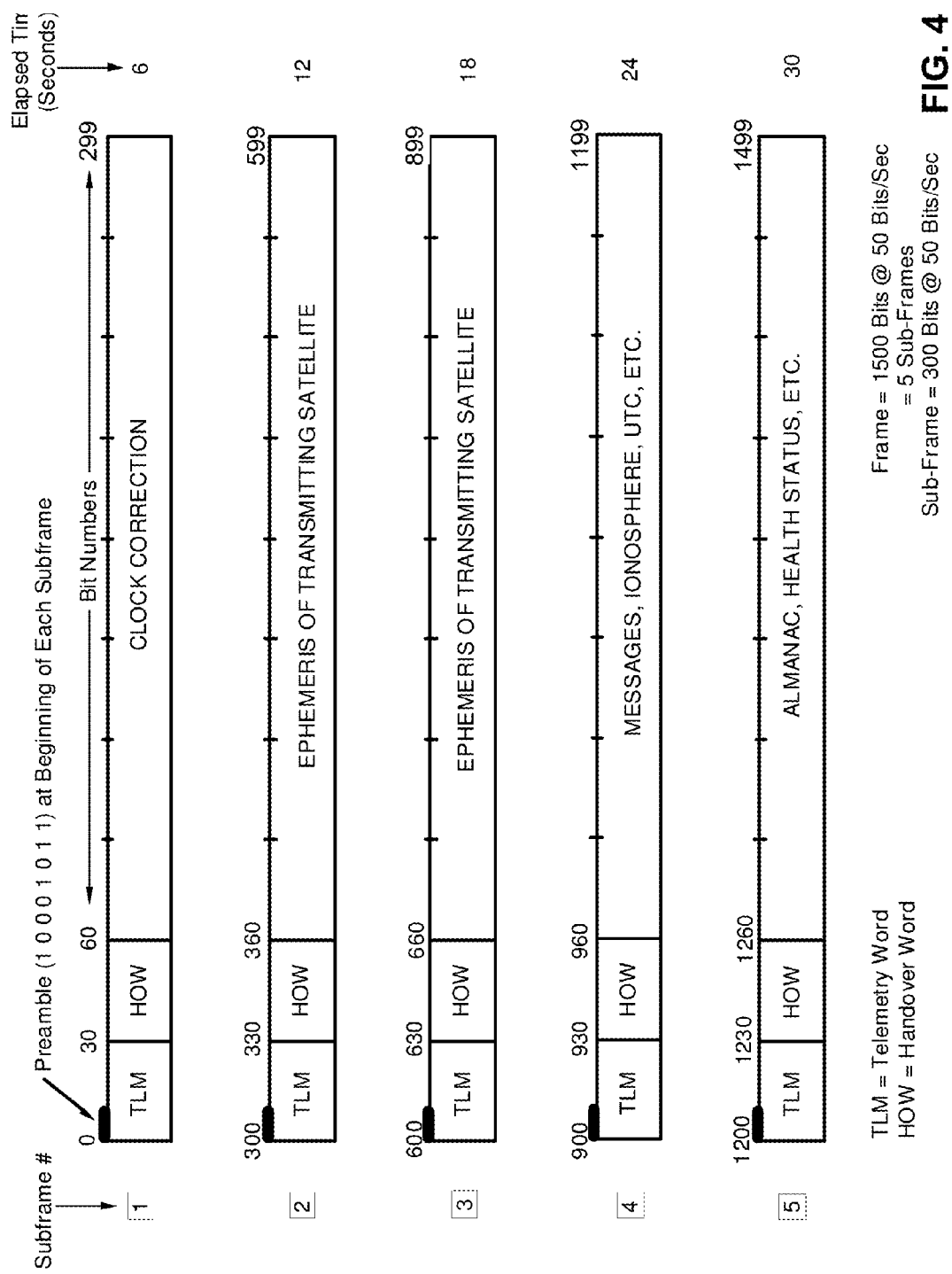
FIG. 4 is a diagram schematically illustrating an example of the frame and subframe structure of the GPS navigation data stream.

FIG. 4 schematically illustrates the frame and subframe structure of the GPS navigation data stream. A complete navigation data message consists of 25 frames, each containing 1500 bits transmitted at a 50 bit/sec rate. Each frame is subdivided into five 300-bit subframes (#1 through #5 in FIG. 4), each subframe consisting of 10 words of 30-bits each, with the most significant bit (MSB) transmitted first. Thus, at the 50 bits/sec rate, it takes 6 seconds to transmit a subframe, and 30 seconds to complete one frame. Transmission of the complete 25-frame navigation message requires 750 seconds, or 12.5 minutes. Except for occasional updating, subframes #1, #2, and #3 are mostly constant (i.e., repeat) with each frame at the 30 second frame repetition rate. On the other hand, subframes #4 and #5 are each subcommutated 25 times. The 25 versions of subframes #4 and #5 are referred to as pages 1-25. Hence, except for occasional updating, each of these pages repeats every 750 seconds, or 12.5 minutes.

The first 8 bits of each subframe is a fixed 8-bit sequence (1 0 0 0 1 0 1 1) called the preamble, which can be used to locate the beginning of each subframe. The SV transmission time of the first bit in each preamble is a known time, except for a 6-second ambiguity. Thus, the transmission time of the first bit modulo 6 seconds can be established if the occurrence of the preamble can be detected within the navigation data bit stream.

Figure 5:
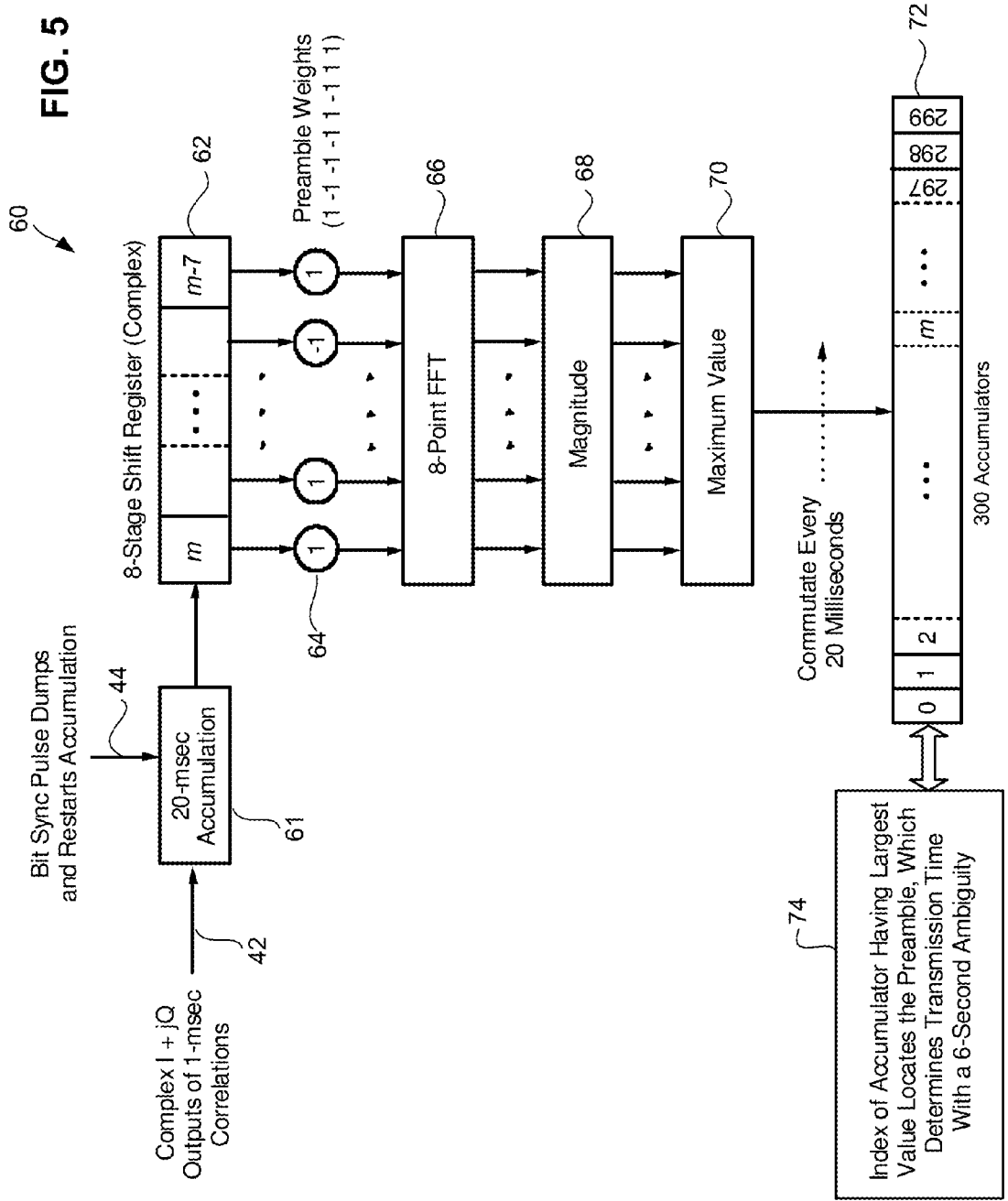
FIG. 5 is a diagram schematically illustrating an example of the preamble locator and a corresponding method for locating the preamble, in accordance with one embodiment of the present invention.

The occurrence of the preamble is detected by a preamble locator 60 (shown in FIG. 1). FIG. 5 schematically illustrates an example of the preamble locator 60 and the corresponding method for locating the preamble, in accordance with one embodiment of the present invention. The preamble locator includes a 20 millisecond accumulator 61, an 8-stage complex shift register 62, a weight multiplier 64, an optional 8-point fast Fourier transformer (FFT) 66, a magnitude calculator 68, a maximum value selector 70, and a bank of three hundred (300) accumulators 72. The weight multiplier 64, the optional 8-point fast Fourier transformer (FFT) 66, the magnitude calculator 68, and the maximum value selector 70 may together be referred to as a weighted multiplexer. As shown in FIG. 5, the complex correlation values 42 output from the millisecond correlations 28 of FIG. 1 are accumulated in the 20 millisecond accumulator 61.

Assuming that the bit synchronization has been established, as discussed above, each 20 millisecond accumulation represents the sum of the complex values within the same data bit, which corresponds to the complex value representing bit 1 or 0. The 20-millisecond accumulations (i.e., corresponding to complex bit values) are passed through the 8-stage shift register 62 at the timing of the bit sync pulse 44. That is, each occurrence of the bit sync pulse 44 dumps the 20-millisecond accumulation into the shift register 62 and simultaneously resets and restarts the accumulation process at the 20 millisecond accumulator 61. Thus, the contents of the shift register 62 are shifted every 20 milliseconds, i.e., bit by bit. The bit sync pulses 44 also drive a modulo-300 counter (not shown), which tags each bit sync pulse with a modulo-300 number (0-299) as shown in FIG. 2C. Each complex bit value is also identified by the corresponding modulo-300 tag of the bit sync pulse 44 at which the complex bit value is shifted into the shift register 62 from the 20-millisecond accumulator 61. The 8-stage shift register 62 holds complex bit values corresponding to 8 data bits, serving as an 8-bit window for searching the known bit sequence of the preamble. As shown in FIG. 5, for example, at the time when the bit sync pulse 44 has a modulo-300 tag m, the shift register 62 holds complex bit values corresponding to the modulo-300 tags from m−7 to m.

The output taps (complex values) of the 8-stage shift register 62 are weighted by the known preamble bit sequence (with a weight of −1 replacing the binary 0) at the weight multiplier 64, as shown in FIG. 5. It should be noted that, when the data bit value changes, a complex vector representing the bit value flips in the complex plane. Thus, when the preamble fully occupies the shift register 62, the weighting by the known bit sequence of 1 and −1 (except noise) make all of the vectors for 8 bits identical (except for noise). If there is no Doppler error, the weighted complex values (i.e., aligned vectors) may be simply summed (operation of the 8-point FTT may be inhibited), and the magnitude of the sum tends to be largest when the 8-stage shift register 62 contains the preamble. However, the FLL 14 (shown in FIG. 1) may not perfectly compensate the Doppler effects, and Doppler compensation at the phase rotator 12 may not be perfect due to noise, so the complex vector may still be slowly rotating. Accordingly, as shown in FIG. 5, immediately after each shift, an 8-point FFT (66) is performed on the weighted outputs, the magnitudes of the 8-point FFT outputs are computed (68), and the maximum value of the magnitudes of the 8-point FFT outputs is selected (70). The maximum value is placed into one of the 300 accumulators 72. The specific accumulator 72m has the same index m as the modulo-300 tag of the latest bit sync pulse (0≤m≤299), as shown in FIG. 5.

FIG. 2D schematically illustrates an example of the operation of placing the magnitude of the weighted sum (the maximum value thereof after the 8-point FFT) of eight complex bit values to the accumulators. In FIG. 2D, A, B, C . . . represent complex bit values (i.e., the 20-millisecond accumulation corresponding to bit 1 or 0) held in the shift register. In this example, as shown in FIGS. 2C and 2D, the shift register contains the full preamble at the sync pulse with the moulo-300 tag m, where the complex bit value B having the moulo-300 tag m−7 corresponds to the first (start) bit of the preamble. This process may be repeated a number of times in order to average out the noise.

When the preamble fully occupies the shift register 62 (which happens every 300 bits of the navigation message), the maximum magnitude of the 8-point FFT outputs tends to be largest, and over time the corresponding accumulator 72m (FIG. 5) will build up a value larger than that of the other accumulators. Thus, after a sufficiently long time, the index m of the accumulator 72 containing the largest accumulated value will be the modulo-300 tag m of the bit sync pulses 44 at which times the preamble becomes fully within the shift register 62, as shown in FIG. 2E.

The preamble locator 60 also includes a controller 74 to determine a specific accumulator 72m of the bank of the 300 accumulators which contains the largest value, and to identify the bit sync pulse having the index m−7 as the location of the first bit of the preamble. The controller 74 may include a transmission time determiner (not shown) for determining transmission time of the target segment with a certain time ambiguity, based on the bit location of the target segment and known transmission time of a particular bit (i.e., the first bit of the subframe) in the navigation message. In this way the transmission time of the first bit of the preamble, which is also the first bit in the subframe, can be determined with a 6-second ambiguity.

If the FLL 14 could maintain a zero frequency error, as mentioned above, the 8-point FFT 66 would not be necessary, because the maximum magnitude of the 8-point FFT outputs would tend to occur in the zero-frequency FFT output bin (the output of this frequency bin is just the sum of the weighted outputs of the shift register taps). However, because noise causes a nonzero frequency error in the FLL tracking by the FLL 14, there can be a signal loss due to reduced coherence in summing the weighted outputs. The FFT regains the coherence by neutralizing the frequency error in forming one of its outputs.

Since the preamble contains only 8 bits, there is the possibility that the same sequence of bits will appear in other parts of the navigation message. However, it is very unlikely this will happen at the same spot in every subframe. Since the preamble appears in every subframe, its occurrence will be dominant.

Computer simulations show that the preamble can be reliably detected at −160 dBm by observing only 5 frames (150 seconds or 2.5 minutes of data), and at −170 dBm by observing 25 frames (750 seconds or 12.5 minutes of data).

The requirement of 300 accumulators 72 to locate the preamble can be mitigated in various ways. One method is to search smaller portions of the 300 bit subframe period, one portion at a time. For example, if each portion contains 50 bits, the same 50 bit positions of each subframe could be searched using 50 accumulators, and the maximum accumulator value retained. This process would be repeated 6 times to cover the full 300-bit subframe period, after which the maximum of the 6 maxima would locate the preamble. Of course, this would increase the search time by a factor of 6.

Another method could be used if approximate time is available from an outside source. For example, if time is known to within ±0.5 seconds, only about 50 bits of data need to be searched every 6 seconds, and only 50 accumulators would be required. Both methods could be used to further reduce the number of accumulators. For example, the 50 bits of data could be divided into 5 portions of 10 bits each, reducing the number of accumulators to 10.

EXAMPLE 2

Detecting the Occurrence of a Larger Segments of Bits

Figure 6:
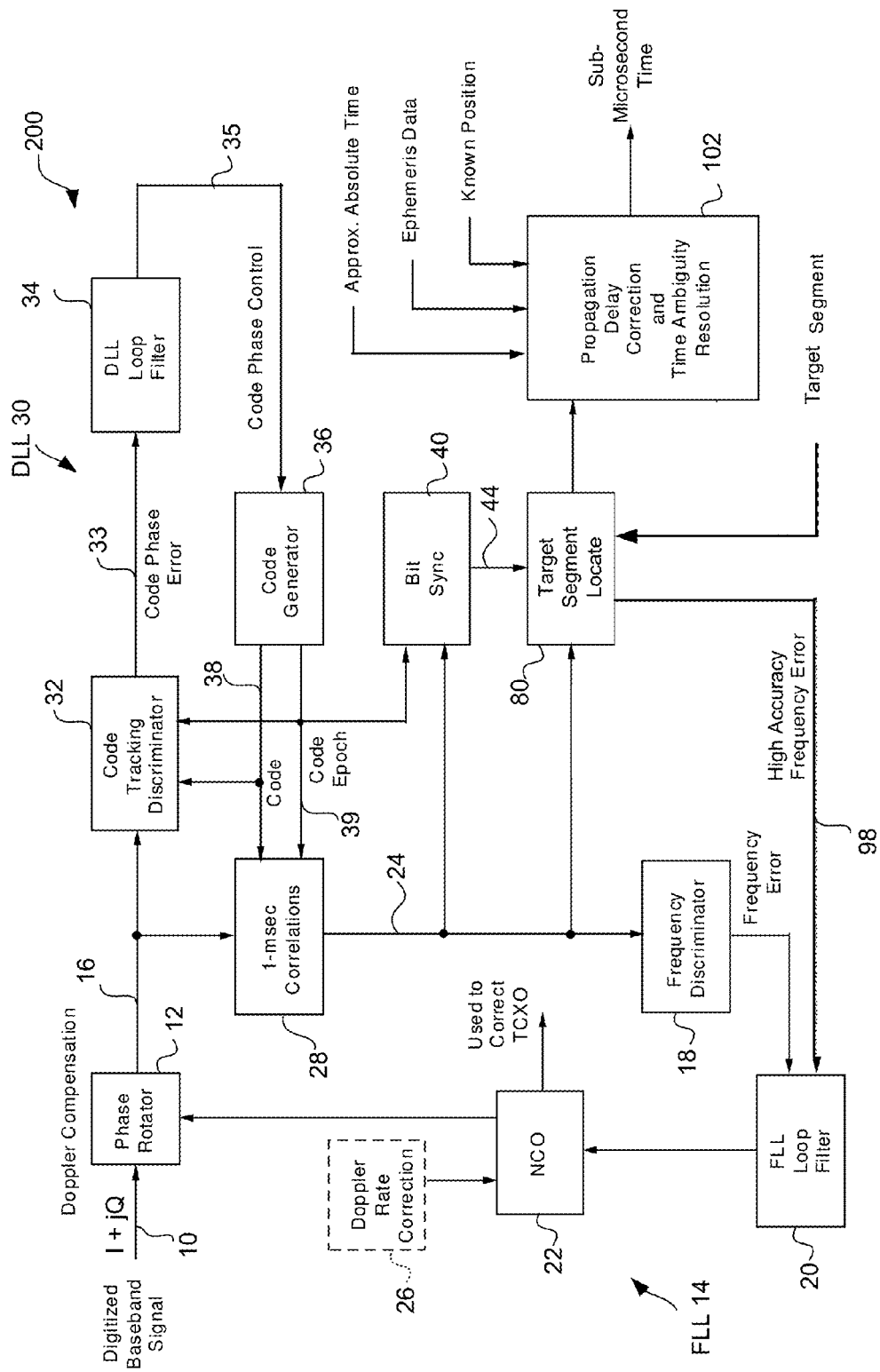
FIG. 6 is a block diagram schematically illustrating a method and the corresponding circuitry for obtaining sub-microsecond time, in accordance with another embodiment of the present invention.

FIG. 6 schematically illustrates an alternative way of obtaining signal transmission time, in accordance with another embodiment of the present invention, which detects the occurrence of larger segments of data bits in the navigation message. In FIG. 6, the like elements bear the like reference numerals as those in FIG. 1. As shown in FIG. 6, the circuitry 200 includes a target segment locater 80 in place of the preamble locater 60 in FIG. 1. Since it is assumed that satellite ephemeris data, satellite clock correction data, almanac data, and perhaps other data, such as Time of Week (TOW), in the navigation message is available from an external source, this information can be used to determine the bit sequences that are used to transmit it. Since the position of these known bit sequences relative to the start of a frame is known, the occurrence of the first bit at the start of a frame can also be determined from the detected known bit sequence. Since the transmission time of the start-of-frame bit is known with an ambiguity of 30 seconds (the length of a frame), the ambiguity can easily be removed by independent knowledge of time to within ±15 seconds.

Figure 7:
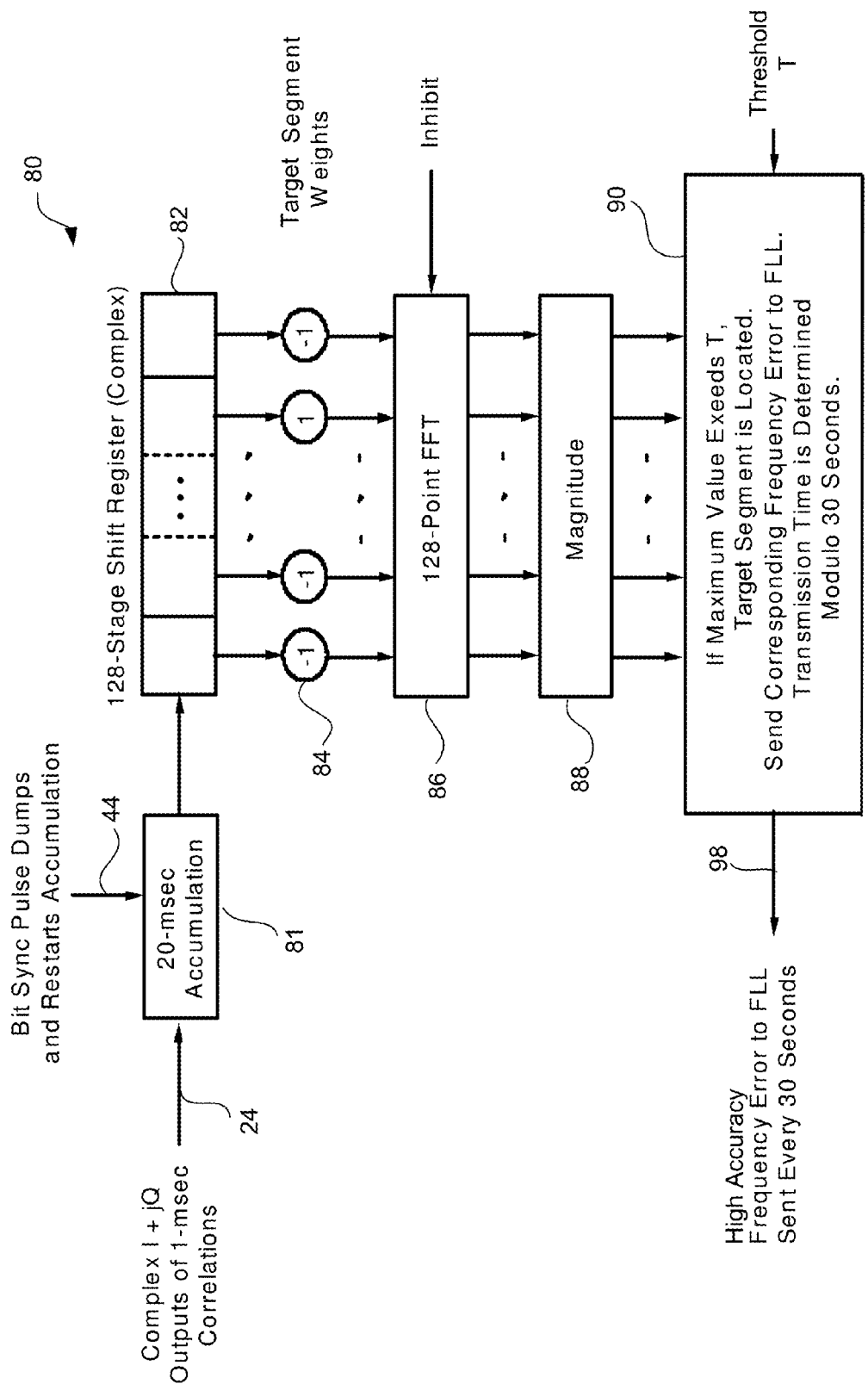
FIG. 7 is a diagram schematically illustrating an example of the target segment locator 80 and the corresponding method for detecting the occurrence of a known bit sequence in accordance with one embodiment of the present invention.

FIG. 7 schematically illustrates an example of the target segment locater 80 and the corresponding method for detecting the occurrence of known bit sequence in accordance with one embodiment of the present invention. For concreteness, it is assumed that a 128-bit sequence with known position relative to the start of the frame has been determined from externally supplied navigation data. A certain number of data bits having a known sequence at a known position within a frame is referred to as a target segment. Thus, the preamble in the previous embodiment may also be a target segment. In this example, the target segment is a 128-bit sequence of the ephemeris data. The number of bits assumed is not limiting but illustrative, and a smaller or larger number can be used. However, in this example, a relatively large number has been chosen to illustrate the large processing gain that can be achieved. As shown in FIG. 7, the target segment locater 80 includes a 20 millisecond accumulator 81, a 128-stage complex shift register 82, a weight multiplier 84, an optional 128-point fast Fourier transformer (FFT) 86, and a magnitude calculator 88. The weight multiplier 84, the optional 128-point fast Fourier transformer (FFT) 86, and the magnitude calculator 88 may together be referred to as a weighted multiplexer. The target segment locater 80 also includes a controller 90 having a maximum value comparer.

The complex outputs 24 of the 1-millisecond correlations 28 (shown in FIG. 6) are accumulated in the 20 millisecond accumulator 81, and the outputs of the 20 millisecond accumulator 81, which occur every 20 milliseconds, are passed through the 128-stage shift register 82. Each occurrence of the bit sync pulse 44 dumps the 20-millisecond accumulation into the shift register 82, and simultaneously resets and restarts the accumulation process in the 20 millisecond accumulator 81, in a similar manner as the previous example shown in FIG. 5. Thus, the contents of the shift register 82 are shifted every 20 milliseconds. The bit sync pulses 44 also drive a modulo-1500 counter (not shown), which tags each bit sync pulse 44 with a modulo-1500 number (0-1499).

The output taps of the 128-stage shift register 82 are weighted by the known bit sequence from the externally supplied navigation data at the weight multiplexer 84. Similarly to the previous example, data bit 0 is replaced with −1 in the weighting Immediately after each shift, a 128-point FFT 86 is performed on the weighted outputs, and the magnitude of each of the 128 FFT outputs is computed (88). The maximum magnitude of the 128 FFT outputs is compared with a predetermined threshold T at the maximum value comparer in the controller 90. Since the target segment has a sufficiently large number of bits in a particular sequence (which tends to be random or non-repetitive), the wholly contained segment in the 128-stage shift register 82 would produce a significantly greater value than any other cases. Thus, the threshold T may be set, for example, based on the data length of the target segment and expected noise level.

If the threshold T is exceeded, it is determined that the known bit sequence of the target segment (ephemeris data in this example) is wholly contained in the shift register 82, and the modulo-1500 tag of the latest bit sync pulse 44 is recorded. Since the location of the known bit sequence relative to the first bit of the frame is known, the modulo-1500 tag of the bit sync pulses at the beginning of the first bit of the frames is also now known, and the transmission times of these first bits are known with a 30 second ambiguity. In this way, the controller 90 identifies, if the maximum value (the weighted sum) exceeds the predetermined threshold T, the bit location of the target segment from the recorded bit sync pulse.

The specific target sequence only occurs once in every frame (i.e., in every 30 seconds), while the preamble in the previous example occurs once in every subframe (i.e., in every 6 seconds). Thus, if the approximate time is known within 30 seconds (±15 seconds) from an external source, the accurate transmission time can be determined In addition, as soon as the maximum magnitude exceeds the threshold T, the target segment location can be declared, without searching through the remaining frame.

This method is very reliable because of the large processing gain (about 21 dB) inherent in the cross-correlation of the known bit sequence with the signal, since a relatively large number of bits (compared to 8 bits of the preamble) are summed Furthermore, the probability is very small that the same bit sequence will appear in other places within the frame. Additionally, no accumulator banks are required, substantially reducing cost of the receiver.

The 128-point FFT 86 serves the same purpose as the 8-point FFT 66 used to locate the preamble, as described previously. However, because of the large processing gain, the 128-point FFT 86 can serve another valuable purpose. When the threshold T is exceeded, the frequency bin with the largest output magnitude provides a very accurate indication of the FLL frequency error, because the frequency resolution of the 128-point FFT is 1/(128×0.02)=0.39 Hz. This error can be sent as a high accuracy frequency error signal 98 to the NCO 22 at 30-second intervals, as shown in FIG. 6, to substantially enhance the operation of the FLL 14, in fact, enabling tracking of the signal at −170 dBm. Thus, the controller 90 may also include a frequency error signal generator to output the high accuracy frequency error signal 98.

Satellite clock correction data present in subframe #1, which also occurs once in every frame, can be used in the same way as ephemeris data, again resulting in determination of transmission time with a 30 second ambiguity.

If the known bit sequence is from the almanac, the time ambiguity can be increased to 12.5 minutes, because the known bit sequence will occur only in one of the 25 frames constituting the complete navigation message. However, it may take up to 12.5 minutes to detect the sequence.

Another bit sequence that can be known is the Time of Week (TOW) in the navigation message. The TOW consists of the first 17 bits of the second 30-bit word in each subframe. If approximate time is known to ±3 seconds, the 17-bit pattern can be determined and its occurrence detected. The result is unambiguous transmission time at any point on the received signal.

Time Ambiguity Resolution and Correction for Signal Propagation Time

As shown in FIGS. 1 and 6, the final step in obtaining sub-microsecond local time is resolution of the remaining time ambiguity and correcting for signal propagation delay which are performed by a propagation delay correction and a time ambiguity resolution section of the local time determination circuit 102.

1. Resolution of Time Ambiguity

The time ambiguity is resolved using knowledge of approximate time at the receiver, which can come from various sources.

For Example 1 of obtaining transmission time (by detecting the preamble), approximate time must be within ±3 seconds, and for Example 2 (by detecting a target segment from the externally supplied navigation data), it must be within ±15 seconds, which is easier to accomplish, when the target segment occurs once in every frame. If Example 2 uses a known bit sequence from the almanac, approximate time only needs to be known within ±6.25 minutes. These accuracies, especially the latter, are within the range of a low-cost clock, such as that found in quartz-controlled wristwatches that have been initially set with sufficient accuracy and maintained for periods of days or weeks (these clocks can also be calibrated for rate of error to permit the required accuracy over much longer periods). Approximate time to ±3 seconds might also be obtained via ADSL, or possibly over cellular telephone networks. The ±6.25 minute accuracy and perhaps the ±15 second accuracy can be obtained via the Internet. Another source of approximate time is the reception of atomically regulated low-frequency radio signals from stations such as WWVB in the United States or its counterparts in Japan and Europe. The time accuracy available from these sources is generally within the 0.01-0.1 second range if no attempt is made to correct for propagation delay.

Approximate time can also be established by tracking only two satellites if the receiver position is known, ephemeris data is available, and altitude as a function of latitude and longitude is known (for example, from a map database). The information of the receiver position (latitude, longitude, and altitude) and the ephemeris data may be automatically or manually obtained from the Internet, by connecting the receiver to the Internet via wireless or wired network, or other communication links The position information may also be obtained using the GPS receiver itself. For example, if the receiver is in a house or building ("indoor") and thus is receiving a very weak GPS signal, the receiver may be moved outside or to a nearby location with good signal reception (within an acceptable position accuracy, for example, 100 meters) so as to record the current receiver position. As long as the receiver remains within a range of acceptable position accuracy, the transfer time detection and the time ambiguity resolution can be performed in the same manner.

The method of the time ambiguity resolution is similar to the method of obtaining time from 5 or more satellites when the receiver position is not initially known and the signals are too weak to recover navigation data, as described in Magellan Systems Japan, Inc. Patent Application Serial Number 11/103,499, filed in the United States Patent and Trademark Office by Applicant on Apr. 12, 2005, now U.S. Pat. No. 7,362,265, issued Apr. 22, 2008. The method is based on the fact that with a known receiver position, the modulo-20 millisecond difference in transmission times of the two simultaneously observed signals is a known function of approximate time. Approximate time can be calculated by evaluating the inverse of this known function at the measured modulo-20 millisecond difference in transmission times. Expected accuracies will generally be within several seconds.

2. Correction for Propagation Delay

Although the above Examples 1 or 2, followed by time ambiguity resolution, can determine the unambiguous GPS transmission time of any point on the observed received signal with sub-microsecond accuracy, time at the receiver is the sum of the transmission time and the propagation time from the satellite to the receiver. The propagation time is easily calculated, since the position of the satellite at the transmission time is accurately known, and also the receiver position is assumed to be known. This enables the calculation of the satellite-to-receiver distance, which when divided by the speed of light, gives the signal propagation time. The accuracy in establishing local time depends on how accurately the position of the receiver is known (see next section).

Methods of Initially Establishing the Initial Receiver Position

The accuracy of the time transfer will depend on how accurately the position of the receiver is known. For sub-microsecond accuracy, the position uncertainty is preferably less than approximately 100 meters. For ±10 microsecond accuracy, a position uncertainty less than approximately 1000 meters is acceptable.

The receiver's fixed position can be obtained in various ways. One method is to use assisted indoor positioning technology such as that recently developed by Magellan Systems Japan, Inc., with a typical positioning accuracy of less than 100 meters, as mentioned above. Another method is to locate the receiver coordinates on a map provided by internet services such as Google Earth. If this method is used, the receiver coordinates must somehow be entered into the GPS receiver. Yet another method is the use of positioning technology for cellular telephones if its positioning accuracy is sufficient (in many cases it will not be).

Figure 8:
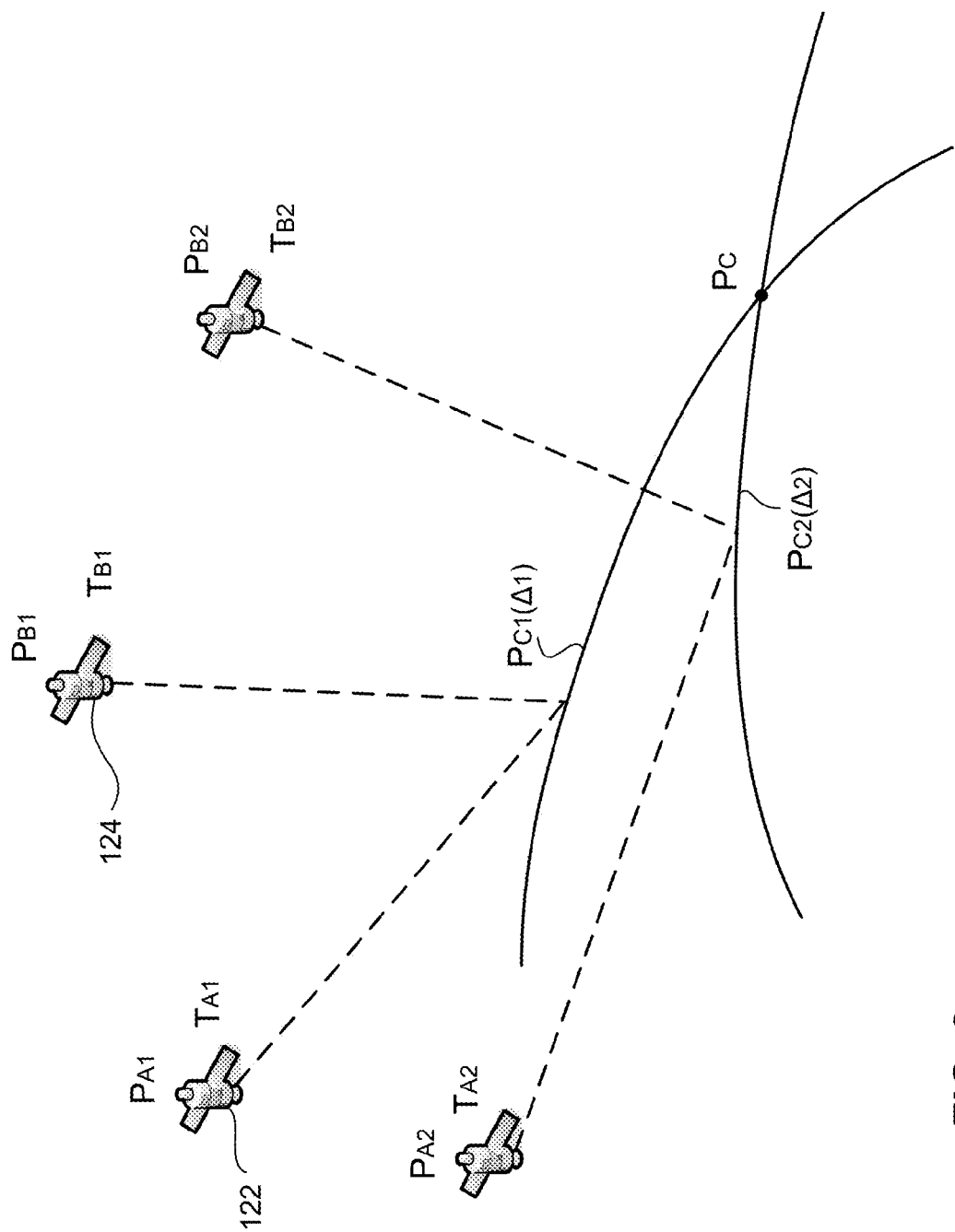
FIG. 8 is schematic diagram illustrating a method for obtaining the receiver's position from two GPS signals, in accordance with one embodiment of the present invention.

A fourth method of establishing the receiver's position with as few as 2 satellites can be used if enough time is available (perhaps an hour or more) and altitude as a function of latitude and longitude is available, in accordance with one embodiment of the present invention. For example, due to buildings or other structures, only 2 satellite signals may be available. FIG. 8 schematically illustrates the method for obtaining the receiver's position from two GPS signals, in accordance with one embodiment of the present invention. The steps of this method, assuming that 2 satellites are being tracked, are as follows:
1. Observing the two GPS signals from the two satellites 122 (A) and 124 (B) simultaneously, which defines a point on each signal structure, and obtain the two GPS transmission times $T_{A1}$ and $T_{B1}$ of the respective points using a technique such as Example 1 or Example 2 described above, including resolution of time ambiguity.
2. Using the two GPS transmission times $T_{A1}$ and $T_{B1}$ and the ephemeris data to accurately locate the positions $P_{A1}$ and $P_{B1}$ of the two satellites.
3. Computing the difference in the two transmission times ($\Delta_1 = T_{A1} - T_{B1}$). This difference $\Delta_1$, together with the knowledge of altitude as a function of latitude and longitude, defines a line of position (LOP) $P_{A1}$ ($\Delta_1$) on the surface of the earth along which this time difference would be observed.
4. After a sufficiently long time (perhaps an hour or more), repeating steps 1 through 3 (the same two satellites at different positions $P_{A2}$ and $P_{B2}$ or a different pair of satellites may be used). The result is a second LOP $P_{C2}$ ($\Delta_2$) on the surface of the earth, where $\Delta_2 = T_{A2} - T_{B2}$, $T_{A2}$ and $T_{B2}$ are the two GPS transmission times of the two satellites in a different geometry after a certain time period, or of a different pair of two satellites that gives a different geometry.
5. Obtaining the receiver position at the intersection $P_C$ of the two LOP's.

The accuracy of this method depends on the satellite-receiver geometry. Dilution of Precision (DOP) calculations can be used to assess the positioning accuracy. Time for signal acquisition can be reduced by using low frequency atomically-controlled radio signals such as the 60 kHz signal from WWVB in Fort Collins, Colo., to accurately calibrate the TCXO reference oscillator in the receiver.

Total Loss of GPS Signals

If all GPS signals are lost, maintenance of local time accuracy will depend on the stability of the receiver's reference oscillator (usually a low-cost TCXO), unless an external source of timing information is available. During normal operation, the long term TCXO frequency drift can be very precisely calibrated, even using just one satellite, because the receiver knows time very accurately. The length of time the TCXO can "free-wheel" until a 1-microsecond time error develops is equal to the reciprocal of the calibration accuracy in parts per million (ppm). For example, if the TCXO has been calibrated to within 0.01 ppm, it can run autonomously for about $\frac{1}{0.01} = 100$ seconds before developing a ±1-microsecond error.

Another strategy for handling total signal losses is to use low-frequency atomically-controlled radio signals if they are available. For example, the 60 kHz signal from WWVB in Fort Collins, Colorado is transmitted with a stability of 1 part in $10^{12}$. A clock phase-locked to this received signal probably can maintain sub-microsecond time indefinitely once the clock has been set during normal operation when GPS signals are available. However, the stability of the WWVB signal propagation paths should be investigated.

The extreme sensitivity of the tracking methods described above, especially when the FLL error signal is derived as in Example 2, might well make total GPS signal dropouts quite rare in most applications.

Satellite-to-Satellite Handovers

Because the GPS satellites rise and set, the receiver must be able to seamlessly transfer its tracking from one satellite to another. This should not be a problem, because in normal operation even with only one satellite, the TXCO frequency is calibrated quite accurately, time is known at the sub-microsecond level, and the distance to any satellite can be accurately computed. This should permit acquiring a new satellite with essentially no searching in either frequency or code phase.

While this invention has been described in terms of several preferred embodiments, there are alterations, permutations, modifications, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A method of sub-microsecond time transfer in a GPS/GNSS receiver using a weak GPS/GNSS signal from a satellite, the method comprising:
   receiving a digitized complex baseband signal of the GPS/GNSS signal, the baseband signal carrying a received PN code having a code period and a navigation message having data bits, each data bit corresponding to twenty code periods;
   generating a generated PN code for the satellite and keeping the generated PN code time-aligned with the received PN code;
   generating a timing signal indicating code epochs of the generated PN code, each code epoch marking a beginning of each period and being tagged with a modulo-20 number;
   cross-correlating the baseband signal and the generated PN code for each code period controlled by the timing signal, so as to output a complex correlation value at each code epoch, a sequence of the complex correlation values forming a navigation data stream representing the navigation message;
   locating data bit boundaries of the navigation data stream and generating bit sync pulses at the bit boundaries, locating data bit boundaries including:
   (a1) receiving the navigation data stream and placing the complex correlation values in a 20-stage complex shift register at a timing of the corresponding code epochs, the shift register holding a sequence of most recent 20 complex correlation values;
   (b1) summing the 20 complex correlation values held in the shift register at each code epoch and obtaining a magnitude value of the sum of the 20 complex correlation values;
   (c1) storing the magnitude value in one of 20 accumulators which is associated with the modulo-20 number corresponding to that of the code epoch at which the latest complex correlation value of the summed 20 complex correlation values was placed into the shift register;
   (d1) iterating steps (a1) through (c1) until each of the 20 accumulators has a respective magnitude value placed therein;
   (e1) repeating step (d1) for a plurality of times such that each of the 20 accumulators accumulates a certain number of the magnitude values;
   (f1) determining which one of the 20 accumulators contains a largest accumulated value of the magnitude values and the specific modulo-20 number associated therewith;

(g1) identifying the code epoch having the specific modulo 20 number as a data bit boundary of the navigation data stream; and (h1) outputting the bit sync pulses at a timing of the code epochs tagged with the specific modulo 20 number, each bit sync pulse being tagged with a modulo-M number;

detecting a target segment in the navigation message and determining a data bit location of the target segment in the navigation message;

determining transmission time of the target segment from the satellite based on the determined data bit location, wherein the transmission time has a certain time ambiguity;

solving the certain time ambiguity using approximate time obtained from a source external to the GPS/GNSS receiver; and correcting the transmission time for a propagation delay so as to obtain sub-microsecond time transfer.

2. The method according to claim 1, wherein the detecting the target segment and determining the data bit location of the target segment in the navigation message includes:

(a2) receiving the navigation data stream and summing the complex correlation values for one data bit period in accordance with the bit sync pulse to obtain a complex bit value for each data bit;

(b2) placing the complex bit value in a k-stage complex shift register at a timing of the corresponding bit sync pulse, the k-stage shift register holding a sequence of most recent k complex bit values;

(c2) obtaining a weighted sum of the sequence of the most recent k complex bit values, wherein each of the k complex bit values is weighted by corresponding one of a sequence of k weights, the sequence of k weights corresponding to a known k bit sequence of the target segment; and (d2) determining the data bit location of the target segment based on the weighted sum and the corresponding bit sync pulse at which the latest complex bit value of the k complex bit values is placed into the k-stage complex shift register and a specific modulo-M number associated with the corresponding bit sync pulse.

3. The method of claim 2, wherein said step (c2) for obtaining the weighted sum includes: performing a k-point fast Fourier transform (FFT) on the weighted complex bit values to generate k FFT outputs; calculating a magnitude of each of the k FFT outputs; and obtaining a maximum value of the magnitudes as the magnitude of the weighted sum.

4. The method of claim 2, wherein M is 300, the target segment has the known sequence of k bits at the known data bit location in each subframe of the navigation message, and each bit sync pulse is tagged by a modulo-300 number, and wherein (d2) determining the data bit location includes:

(e2) calculating a magnitude value of the weighted sum and storing the magnitude in one of a plurality of accumulators which is associated with the modulo-300 number of the corresponding bit sync pulse at which the latest complex bit value is placed into the k-stage shift register;

(f2) iterating steps (a2) through (d2) until the magnitude value of the weighted sums are placed in a predetermined number of the accumulators;

(g2) repeating step (f2) a plurality of times such that each of the predetermined number of accumulators accumulates a certain number of the magnitude values of the weighted sums;

(h2) determining which of the accumulators contains a largest accumulated value of the magnitude values and a specific modulo-300 number associated therewith; and (i2) identifying a data bit location of the target segment within the subframe based on the specific modulo-300 number associated with the one of the accumulators.

5. The method of claim 2, wherein M is 1500, the target segment has the known segment of k bits at the known data bit location in each frame of the navigation message, and each bit sync pulse is tagged by a modulo-1500 number, and wherein (d2) determining the data bit location includes:

(e2) determining if the magnitude of the weighted sum exceeds a predetermined threshold value;

(f2) if the magnitude of the weighted sum does not exceed the predetermined threshold value, repeating steps (a2) through (d2); and (g2) if the magnitude of the weighted sum exceeds the predetermined threshold value, identifying a data bit location of the target segment based on a specific modulo-1500 number of the bit sync pulse at which the latest bit value is placed into the k-stage complex shift register.

6. The method of according to claim 2, wherein the target segment is a preamble of the subframe in the navigation message, where number k is 8, a Time of Week (TOW) in the navigation message, where number k is 17, or an ephameris data segment in the navigation message, where number k is 128 or more.

7. The method according to claim 1, further comprising: Doppler-compensating the baseband signal before said cross-correlating, using a frequency-locked loop (FLL).

8. The method of claim 1, further comprising: generating a frequency error signal based on a frequency associated with the k-point FFT output having the maximum magnitude.

9. The method according to claim 1, wherein the GPS/GNSS signal level is less than about −151 dBm.

10. The method according to claim 1, wherein the certain time ambiguity is a 6 (±3) second ambiguity.

11. The method according to claim 1, wherein the certain time ambiguity is a 30 (±15) second ambiguity where when the target segment occurs once in every frame, and the certain time ambiguity is a 12.5 (±6.25) minute ambiguity where the target segment occurs once in every navigation message.

12. A GPS/GNSS receiver having a sub-microsecond time transfer circuit using a weak GPS/GNSS signal from a satellite, a complex digitized baseband signal of the GPS/GNSS signal carrying a received PN code having a code period and a navigation message having data bits, each data bit corresponding to code periods, the GPS/GNSS receiver comprising: a PN code generator configured to generate a generated PN code for the satellite, the PN code generator outputting a timing signal indicating code epochs of the generated PN code, each code epoch marking a beginning of each period and being tagged with a modulo-20 number;

a delay-locked loop configured to keep the generated PN code time-aligned with the received PN code of the baseband signal;

a cross-correlator configured to cross-correlate the generated PN code and the baseband signal controlled by the timing signal so as to output a complex correlation value at each code epoch, a sequence of the complex correlation values forming a navigation data stream representing the navigation message;

a bit synchronizer coupled to the cross-correlator, and configured to locate data bit boundaries of the navigation data stream and generate bit sync pulses at the data bit boundaries, each of the bit sync pulses being tagged with a modulo-M number;

a target segment locator coupled to the bit synchronizer and the cross-correlator, and configured to detect a target segment in the navigation message, the target segment having a known sequence of k bits at a known data bit location in the navigation message; and a transmission time determiner configured to determine transmission time of the target segment with a certain time ambiguity, based on the determined data bit location of the target segment and known transmission time of a particular data bit in the navigation message, to solve the certain time ambiguity using approximate time obtained from a source external to the receiver, and to correct a propagation delay of the transmission time so as to obtain sub-microsecond time transfer.

13. The GPS/GNSS receiver according to claim 12, wherein the bit synchronizer comprises:

a 20-stage shift register configured to place the complex correlation values at a timing of the corresponding code epochs, the 20-stage shift register holding a sequence of most recent complex correlation values;

an adder configured to sum the 20 complex correlation values held in the shift register at each epoch;

a magnitude calculator configured to calculate a magnitude value of the sum of the 20 complex correlation values;

a bank of accumulators configured to store and accumulate the magnitude values in association with the modulo-20 number of the code epoch at which the latest complex correlation value of the 20 complex correlation values is placed into the 20-stage shift register;

a controller configured to determine one of the 20 accumulators that contains a largest accumulated value of the magnitude values and a specific modulo-20 number associated therewith, and to identify the code epoch having the specific modulo-20 number as a data bit boundary of the navigation data stream; and a bit sync pulse generator configured to output the bit sync pulses at a timing of the code epochs tagged with the specific modulo-20 number, each bit sync pulse being tagged with a modulo-M number.

14. The GPS/GNSS receiver according to claim 13, wherein the bank of accumulators includes 300 accumulators.

15. The GPS/GNSS receiver according to claim 12, wherein the target segment locator comprises:

a one-bit accumulator configured to sum the complex correlation values for one data bit period in accordance with the bit sync pulse to obtain a complex bit value for each data bit;

a k-stage shift register configured to place the complex bit value at a timing of the corresponding bit sync pulse, the k-stage shift register holding a sequence of most recent k complex bit values;

a weighted multiplexer configured to obtain a weighted sum of the sequence of the most recent k complex bit values, each of the k complex bit values being weighted by corresponding one of a sequence of k weights, the sequence of k weights corresponding to the known k bit sequence of the target segment; and a controller configured to determine the data bit location of the target segment based on the weighted sum and the corresponding bit sync pulse at which the latest complex bit value of the k complex bit values is placed into the k-stage shift register and a specific modulo-M number associated with the corresponding bit sync pulse.

16. The GPS/GNSS receiver of claim 15, wherein the target segment has the known sequence of k bits at the known data bit location in each subframe of the navigation message, M is 300, and each bit sync pulse is tagged by a modulo-300 number, and wherein the target segment locator further includes:

a magnitude calculator coupled to the weighted multiplexer and configured to calculate a magnitude value of each weighted sum; and a bank of accumulators configured to store and accumulate the magnitude value in association with the modulo-300 number corresponding to that of the bit sync pulse at which the latest complex bit value is place into the k-stage shift register, wherein the controller is configured to determine one of the accumulators which contains a largest value of the accumulated magnitude values and a specific modulo-300 number associated therewith, and identify a data bit location of the target segment within the subframe based on the specific modulo-300 number associated with the one of the accumulators.

17. The GPS/GNSS receiver of claim 15, wherein the target segment has the known segment of k bits at the known data bit location in each frame, wherein M is 1500, the bit sync pulse is tagged with a modulo-1500 number, and the target segment locator further including:

a comparator configured to determine if the magnitude of the weighted sum exceeds a predetermined threshold value, wherein the controller is further configured to identify, if the magnitude of the weighted sum exceeds a predetermined threshold value, a data bit location of the target segment based on a specific modulo-1500 number of the bit sync pulse at which the latest bit value is placed into the k-stage shift register.

18. The GPS/GNSS receiver according to claim 13, wherein the GPS/GNSS signal level is less than about −151 dBm.

* * * * *